(12) United States Patent
Boehlke

(10) Patent No.: US 10,582,461 B2
(45) Date of Patent: *Mar. 3, 2020

(54) SOFTWARE BASED AUDIO TIMING AND SYNCHRONIZATION

(71) Applicant: Summit Wireless Technologies, Inc., Beaverton, OR (US)

(72) Inventor: Kenneth A. Boehlke, Portland, OR (US)

(73) Assignee: Summit Wireless Technologies, Inc., Beaverton, OR (US)

( * ) Notice: Subject to any disclaimer, the term of this patent is extended or adjusted under 35 U.S.C. 154(b) by 94 days.

This patent is subject to a terminal disclaimer.

(21) Appl. No.: 15/863,637

(22) Filed: Jan. 5, 2018

(65) Prior Publication Data

US 2018/0192385 A1 Jul. 5, 2018

Related U.S. Application Data

(63) Continuation of application No. 15/660,800, filed on Jul. 26, 2017, now abandoned, which is a continuation of application No. 14/186,852, filed on Feb. 21, 2014, now Pat. No. 9,723,580.

(51) Int. Cl.
| | |
|---|---|
| *H04W 56/00* | (2009.01) |
| *H04R 5/04* | (2006.01) |
| *H04N 21/4363* | (2011.01) |
| *H04N 21/43* | (2011.01) |
| *H04J 3/06* | (2006.01) |

(52) U.S. Cl.
CPC ......... *H04W 56/001* (2013.01); *H04J 3/0664* (2013.01); *H04N 21/4307* (2013.01); *H04N 21/43637* (2013.01); *H04R 5/04* (2013.01); *H04R 2420/07* (2013.01)

(58) Field of Classification Search
CPC ............ H04W 56/001; H04N 21/4307; H04N 21/43637; H04J 3/0664; H04R 5/04; H04R 2420/07
See application file for complete search history.

(56) References Cited

U.S. PATENT DOCUMENTS

| | | | |
|---|---|---|---|
| 4,953,117 A | 8/1990 | Lagadec | |
| 6,269,122 B1 | 7/2001 | Prasad et al. | |
| 7,103,072 B1 | 9/2006 | Sloan et al. | |
| 8,340,672 B2 | 12/2012 | Brown et al. | |
| 8,965,942 B1 | 2/2015 | Rossum | |
| 9,832,497 B2 * | 11/2017 | Stokking | ............... H04N 21/242 |
| 2003/0016770 A1 * | 1/2003 | Trans | ....................... H04B 1/00 375/346 |
| 2003/0235216 A1 | 12/2003 | Gustin | |
| 2004/0228367 A1 | 11/2004 | Mosig | |
| 2007/0030986 A1 | 2/2007 | McArthur et al. | |
| 2009/0135854 A1 | 5/2009 | Bettin et al. | |
| 2010/0158051 A1 | 6/2010 | Hadzic et al. | |
| 2010/0189109 A1 | 7/2010 | Nakajima et al. | |

(Continued)

OTHER PUBLICATIONS

Boatright, "Understanding IEEE's deterministic AV bridging standards," http://staging.embedded.com/print/4008284, May 20, 2009, 9 pgs.

(Continued)

*Primary Examiner* — Jay P Patel
(74) *Attorney, Agent, or Firm* — Chernoff Vilhauer LLP

(57) ABSTRACT

Synchronization of plural outputs of data transported by a wireless network is facilitated by bandlimiting a sample clock signal controlling a rate at which data is processed by the network's devices and/or bandlimiting wall time data controlling the real time for presenting a datum.

13 Claims, 9 Drawing Sheets

(56) References Cited

U.S. PATENT DOCUMENTS

| | | |
|---|---|---|
| 2011/0216660 A1 | 9/2011 | Lee et al. |
| 2014/0043177 A1 | 2/2014 | Paganelli |
| 2014/0118473 A1 | 5/2014 | Halavy et al. |
| 2014/0168277 A1 | 6/2014 | Ashley et al. |
| 2015/0052571 A1 | 2/2015 | Stokking et al. |
| 2015/0171890 A1 | 6/2015 | Paganelli |
| 2015/0245306 A1 | 8/2015 | Boehlke |
| 2017/0325185 A1 | 11/2017 | Boehlke |

OTHER PUBLICATIONS den Hollander et al., "IEEE 802.1AS Timing and Synchronization and its applications," The 4th International Telecoms Synchronization Forum, Nov. 15-16, 2006, Gaithersburg, MD, 44 pgs.

International Search Report and Written Opinion, dated May 22, 2015, PCT International App. No. PCT/US2015/016400, Summit Semiconductor, LLC, 8 pgs.

Steigmann, Richard et al., "Introduction to WISA: WISA—Wireless Interface for Sensors and Actuators," ABB White Paper, V2.0, Jul. 2006, 16 pages.

Henzler, "High-Speed Digital CMOS Circuits," Technische Universtat Munchen, found at http://www.lte.ei.tum.de/lehre/EDHCS/2011/handouts/PhaseLockedLoops_compact.pdf; Summer Term 2011, 2 pages.

Extended European Search Report prepared by the European Patent Office for EP15751788, dated Aug. 4, 2017, 10 pages.

International Search Report prepared by the United States Receiving Office for PCT/US2019/012063, dated May 3, 2019, 4 pages.

Written Opinion prepared by the United States Receiving Office for PCT/US2019/012063, dated May 3, 2019, 7 pages.

\* cited by examiner

SOFTWARE BASED AUDIO TIMING AND SYNCHRONIZATION

CROSS-REFERENCE TO RELATED APPLICATIONS

This application is a continuation-in-part of Ser. No. 15/660,800, which is a continuation of U.S. patent application Ser. No. 14/186,852, filed Feb. 21, 2014, now issued as U.S. Pat. No. 9,723,580 "Synchronization Of Audio Channel Timing".

BACKGROUND OF THE INVENTION

In U.S. patent application Ser. No. 14/186,852, a hardware methodology for recovering and filtering audio timing was presented. The key circuit element in this approach, which is not available on most generic processor SOCs, was a low bandwidth Phase lock Loop (PLL). This PLL was used twice; to filter the beacon based Time Synchronization function (TSF) value and to generate the output audio clock.

For a soft implementation as taught and claimed herein, these two PLL hardware functions are converted to an Estimator 308 and a Sample Rate Converter (SRC) code 310. The present invention again relates to wireless data networks and, more particularly, to a system and method for synchronizing outputs at multiple endpoints in a network which includes a wireless communication link.

While audio and video equipment has historically been connected by analog or digital point-to-point, one-way connections, an increasing portion of multimedia content is distributed over networks. For example, video and uncompressed audio may be streamed from an audio/video source in a media room or closet to a display and multiple speakers of a surround sound system in a remote room or rooms in a residence. Since it is difficult to retrofit finished structures with cabling, in many cases data, including video and audio data, is transmitted from a source to a display, speakers or other output devices over a network that includes a wireless communication link(s) utilizing low cost radio technologies such as frequency modulation and spread spectrum modulation to transport packetized digital data.

Synchronization of outputs and minimization of system latency are critical requirements for high quality audio whether or not combined with video. The human ear is sensitive to phase delay or channel-to-channel latency and multi-channel audio output with channel-to-channel latency greater than 50 microsecond (μs) is commonly described as disjointed or blurry sound. On the other hand, source-to-output delay or latency ("lip-sync") greater than 50 milliseconds (ms) is commonly considered to be noticeable in audio-video systems. In a digital network, such as an audio/video system, a source of digital data transmits a stream of data packets to the network's end points where the data is presented. Typically, a pair of clocks at each node of the network controls the time at which a particular datum is presented and the rate at which data is processed, for examples, an analog signal is digitized or digital data is converted to an analog signal for presentation. The actual or real time that an activity, such as presentation of a video datum, is to occur is determined by "wall time," the output of a "wall clock" at the node. A sample or media clock controls the rate at which data is processed, for example, the rate at which blocks of digital audio data introduced to a digital to analog converter.

Audio video bridging (AVB) is the common name of a set of technical standards developed by the Institute of Electrical and Electronics Engineers (IEEE) and providing specifications directed to time-synchronized, low latency, streaming services over networks. The Precision Time Protocol (PTP) specified by "IEEE Standard for a Precision Clock Synchronization Protocol for Networked Measurement and Control Systems," IEEE Std. 1588-2008 and adopted in IEEE 802.1AS-2011—"IEEE Standard for Local and Metropolitan Area Networks—Timing and Synchronization for Time-Sensitive Applications in Bridged Local Area Networks" describes a system enabling distributed wall clocks to be synchronized within 1 μs over seven network hops.

A master clock to which the remaining distributed clocks, the slave clocks, are to be synchronized is selected either by a "best master clock" algorithm or manually. Periodically, the device comprising the master clock (the "master device") and the device(s) comprising the slave clock(s) (the "slave device(s)") exchange messages which include timestamps indicating the master clock's "wall time" when the respective message was either transmitted or received by the master device. The slave device notes the local wall times when the respective messages were received or transmitted by it and calculates the offset of the slave clock relative to the master clock and the network delay, the time required for the messages to traverse the network from the master device to the slave device. With repeated measurements, the frequency drift of the slave clock relative to the master clock can also be determined enabling the slave clock to be synchronized with the master clock by adjusting the slave clock's wall time for the offset and the network delay and adjusting the slave clock's frequency for any frequency drift relative to the master clock.

PTP can synchronize wall clocks of an extensive network or even plural networks, but the accuracy of PTP can be strongly influenced by the loading and exposure to interference of the wireless communication link(s). An alternative to PTP for synchronizing the wall time at plural devices of a wireless network is the Time Synchronization Function (TSF) specified in IEEE 802.11, "IEEE Standard for Information Technology—Telecommunications and Information Exchange Between Systems Local and Metropolitan Area Networks." Every 802.11 compliant device in a network known as a basic service set (BSS) includes a TSF counter. Periodically, during a beacon interval, devices of the BSS transmit a beacon frame containing a timestamp indicating the local wall time at the transmitting device and other control information. A receiving node or slave device receiving the beacon frame synchronizes its local time by accepting the timing information in the beacon frame and setting its TSF counter to the value of the received timestamp if the timestamp indicates a wall time later than the node's TSF counter.

However, neither PTP nor TSF provide for synchronization of the media or sample clocks which control the rate at which application data is processed by the processing elements of the network's devices. The Audio Video Bridging Transport Protocol (AVBTP) of "IEEE 1722-2011: Layer 2 Transport Protocol for Time Sensitive Applications in a Bridged Local Area Network" provides that each network end point (a device that receives or transmits data) is to recover the sample clock from data in the packetized data stream transmitted by the data source. Each data packet comprises plural application data samples, for example, audio data samples, and a time stamp indicating the wall time at which presentation of the application data in the packet is to be initiated. At each network end point, for example, an audio speaker unit, a sample clock is generated which oscillates at a frequency that enables the plural application data samples in a data packet to be presented for processing within the time interval represented by successive timestamps.

While PTP, TSF and AVBTP provide means for synchronizing distributed clocks, not all packets transmitted by a network data source, particularly packets transmitted wirelessly, reach their destinations. As packets are lost, each network end point, for example, the plural speaker units of a surround sound audio system, receives a respective aliased subsample of the timestamps and over time the clocks of the respective network endpoints will not track. What is desired, therefore, are accurate consistently synchronized sample clocks at a plurality of related network endpoints.

DETAILED DESCRIPTION OF THE INVENTION

Figure 1:
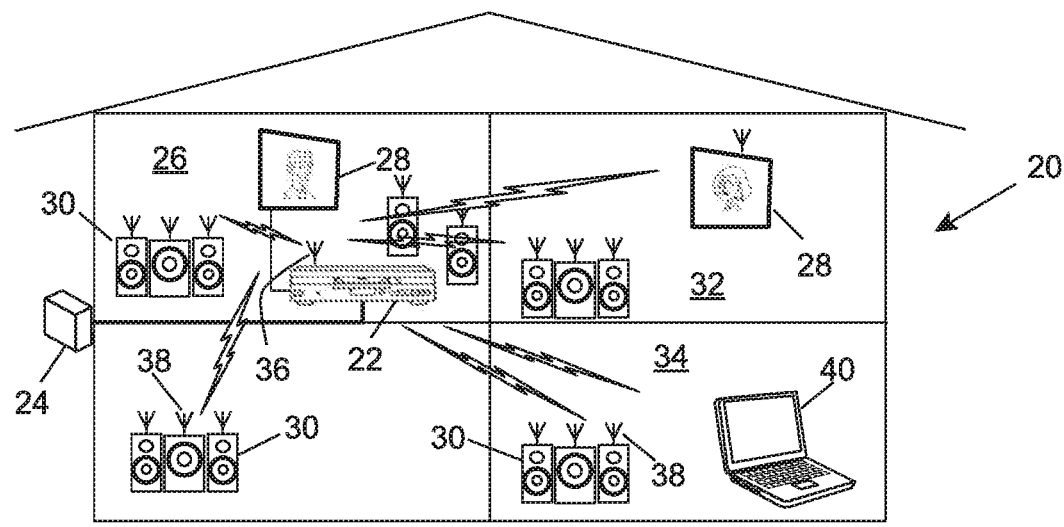
FIG. 1 is a pictorial representation an exemplary audio/video/data distribution network.

Referring in detail to the drawings where similar parts are identified by like reference numerals, and, more particularly to FIG. 1, in a residence 20 data, including video and audio data, is often retrieved from a storage medium, such as a digital versatile disc (DVD) by a DVD player or from a data portal 24 connected to, for example, a wide area fiber optic network or a satellite receiver, and distributed throughout the residence. For examples, digital video and/or multi-channel audio may be distributed from a source 22, for example, a DVD player, located in a media room 26 or closet for presentation by video displays 28 and/or surround sound or stereo speaker units 30 in the media room, a bedroom 32 or a den 34. Since it is difficult to retrofit a finished structure with network cabling at least part of the distribution network may comprise a radio transmitter 36 which may be part of an audio/video/data source 22 and one or more radio receiver(s) 38 which may be incorporated in the networked devices such as a computer 40, a video display 28, or the speaker units 30 of one or more a stereo or surround sound systems.

Synchronization of the various outputs and minimization of system latency are critical requirements of high quality audio/video systems. Source-to-output delay or latency ("lip-sync") is important in audio/video systems, such as home theater systems, where a slight difference, on the order of 50 milliseconds (ms), between display of a video sequence and the output of the corresponding audio is noticeable. On the other hand, the human ear is even more sensitive to phase delay or channel-to-channel latency between the corresponding outputs of the different channels of multi-channel audio. Channel-to channel latency greater than 1 microsecond (μs) can result in the perception of disjointed or blurry audio.

Audio video bridging (AVB) is the common name of a set of technical standards developed by the Institute of Electrical and Electronics Engineers (IEEE) and providing specifications for time-synchronized, low latency, streaming services over networks.

Figure 2:
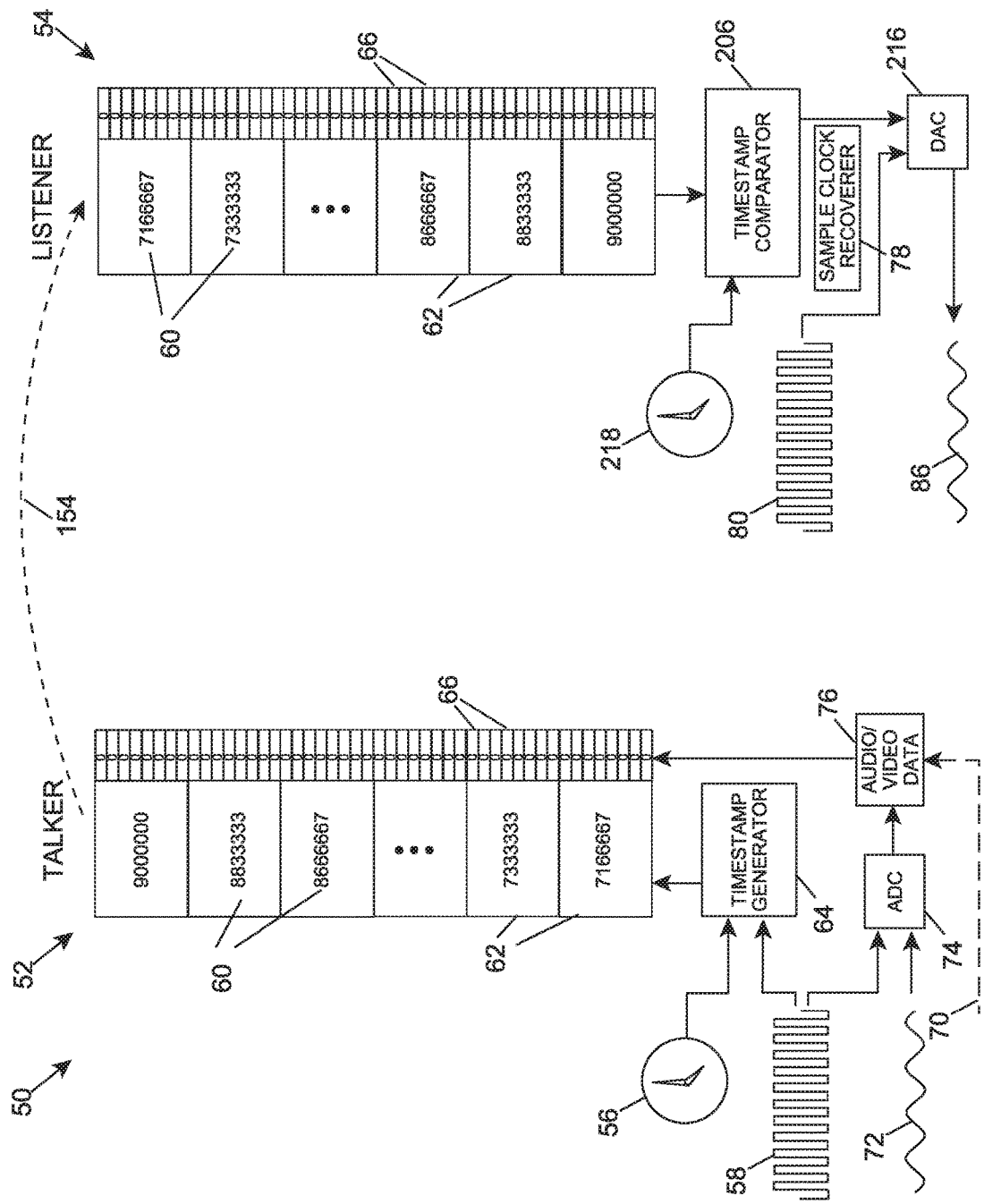
FIG. 2 is a graphic representation of a method of assembling and presenting application data included in data packets having AVBTP timestamps.

"IEEE 802.1AS-2011—IEEE Standard for Local and Metropolitan Area Networks—Timing and Synchronization for Time-Sensitive Applications in Bridged Local Area Networks" describes a system for synchronizing clocks distributed among the nodes of one or more networks of devices. Referring also to FIG. 2, in an audio video bridging (AVB) network 50, each network endpoint, a network node capable of transmitting and/or receiving a data stream, includes two clocks; a "wall" clock 56, 218 and a "media" or "sample" clock 58, 80. Wall time output by the wall clock 56, 218 determines the real or actual time of an event's occurrence and/or the real or actual time difference between the initiation of a task and the task's completion. The sample clock 58, 80 is typically an alternating signal which controls the rate at which data is passed to a media processing device for processing. For examples, in a digital audio system, sample clocks govern the rate at which an analog signal is sampled and the rate at which digital samples are to be passed to a digital-to-analog converter (DAC) controlling the emission of sound by a speaker.

Figure 3:
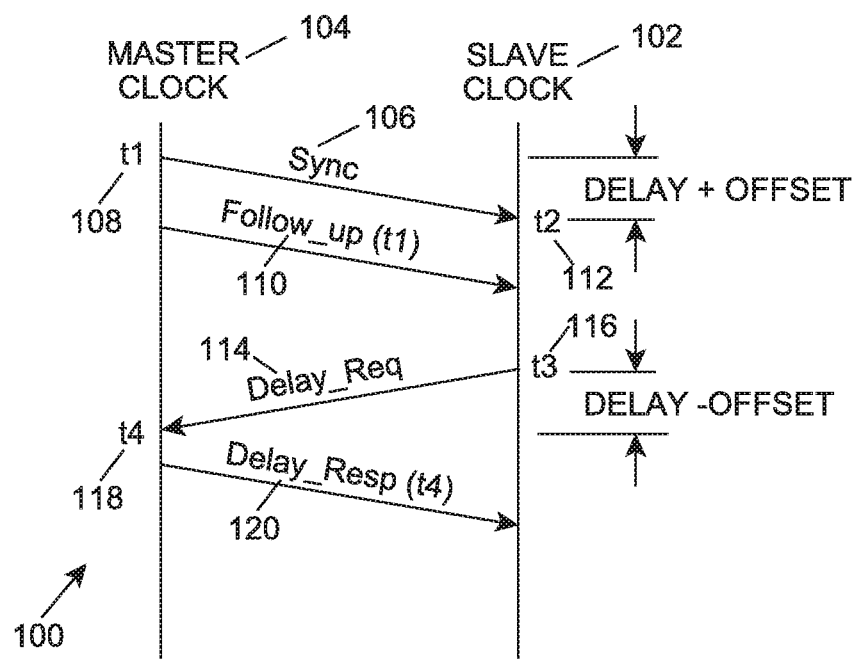
FIG. 3 is a graphical representation of the Precise Time Protocol (PTP) message exchanges between a master clock and a slave clock.

Referring also to FIG. 3, the Precision Time Protocol (PTP) of "IEEE Standard for a Precision Clock Synchronization Protocol for Networked Measurement and Control Systems," IEEE Std. 1588-2008 provides a method 100 of synchronizing the wall time at "slave" clocks 102 distributed among the nodes of a network to the wall time of the network's "master" clock 104.

When operation of a network is initiated, a master clock is selected either manually or by a "best master clock" algorithm. Afterward, messages are periodically exchanged between the device comprising the master clock (the "master device") and the network devices comprising the slave clocks (the "slave devices") enabling determination of the offset, the time by which a slave clock leads or lags the master clock, and the network delay, the time required for data packets to traverse the network. At defined intervals, by default two second intervals, the master device multicasts a Sync message 106 to the other network devices. The precise master clock wall time of the Sync message's transmission, t1, 108 is determined and included as a timestamp in either the Sync message or in a Follow-up message 110. The slave device determines the local wall time, t2, 112 at which the device received the Sync message. A Delay_Req message 114 is then sent by the slave device to the master device at time, t3, 116. The master clock's time of receipt, t4, 118 of the Delay_Req message 114 is determined and the master device responds with a Delay_Resp message 120 which includes a timestamp indicating t4, 118. The slave device determines the network delay and the slave clock's offset from the four times, t1, t2, t3 and t4:

$$\text{Delay} + \text{Offset} = t2 - t1 \quad (1)$$

$$\text{Delay} - \text{Offset} = t4 - t3 \quad (2)$$

$$\text{Delay} = ((t2 - t1) + (t4 - t3))/2 \quad (3)$$

$$\text{Offset} = ((t2 - t1) - (t4 - t3))/2 \quad (4)$$

Consecutive measurements of the offset also permit compensation for the slave clock's frequency drift. With the time and frequency drift determined, each slave clock is adjusted to match the wall time of the master clock by adding or subtracting the offset to or from the local wall time and adjusting the slave clock's frequency.

IEEE 802.11, "IEEE Standard for Information Technology—Telecommunications and Information Exchange Between Systems Local and Metropolitan Area Networks" provides media access control (MAC) and physical layer (PHY) specifications for implementing wireless local area networks (WLAN) referred to basic service sets (BSS). The devices which are parts of a BSS are identified by a service set identification (SSID) which may be assigned or established by the device which starts the network. Each network device or station includes a local timing synchronization function (TSF) timer, the device's wall clock 56, 218, which is based on a 1 mega-Hertz (MHz) clock which ticks in microseconds. During a beacon period all stations in an independent basic service set (IBSS) compete to transmit a beacon. Each station calculates a random delay interval and sets a delay timer scheduling transmission of a beacon when the timer expires. If a beacon arrives before the delay timer expires, the receiving station cancels its pending beacon transmission. The beacon comprises a beacon frame including a timestamp indicating the TSF timer value, the wall time, of the station that transmitted the beacon. Upon receiving a beacon, if the timestamp is later than the receiving station's TSF timer the receiving station sets its TSF timer, for example the wall clock 218, to the value of the timestamp thus synchronizing the TSF timers, the wall clocks, of the transmitting station and the receiving station.

PTP and TSF are responsible for synchronizing the wall clocks of all nodes in the respective network to the same wall time but not for synchronizing the sample clocks controlling the processing of the various media transported by the network. The sample clocks are recovered from the data stream at each of the network's listeners, endpoints receiving the data stream, enabling different sample clocks for different media to be transported on the same network.

Referring to FIG. 2, media sources or talkers 52 embed presentation timestamps 60 in certain data packets 62 transmitted by the respective source. A timestamp generator 64, controlled by the talker's sample clock 58 for the particular medium being processed, inserts a timestamp 60 into a header of a data packet 62 with the wall time from the talker's wall clock 56 as adjusted by a latency normalization value, if any. The timestamp indicates the wall time at which presentation of application data included in the data packet is to be initiated. Plural blocks 66 of application data 76, such as Inter-IC Sound (128) digital audio data, which are obtained from a digital data source 70 or converted from—an analog signal 72 by an analog-to-digital converter (ADC) 74 at a rate determined by the sample clock 58 are also included in each data packet 62. A data block count, included in the header of the data packet, specifies the number of application data blocks 66 to be presented in the interval represented by the difference between successive presentation timestamps. At the listener 54, the sample clock 56 is recovered by a sample clock recoverer 78.

Figure 4:
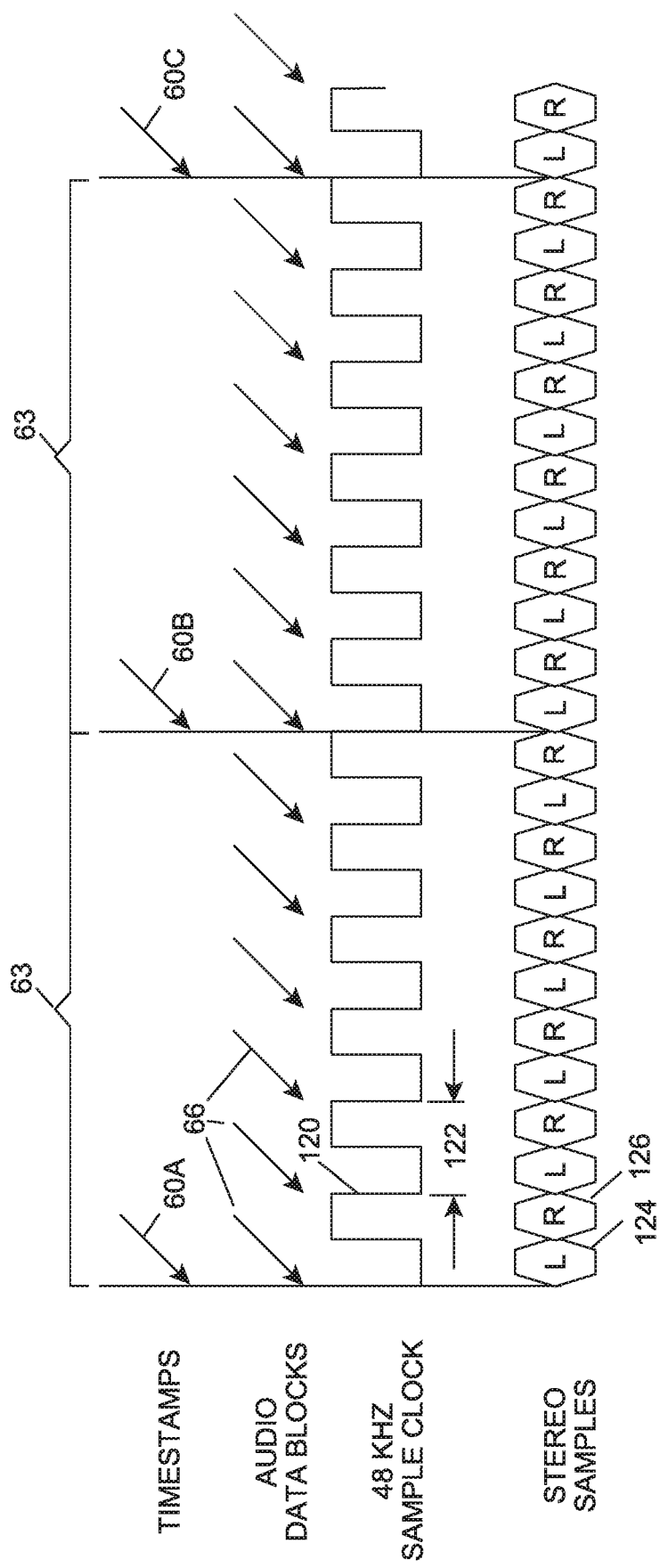
FIG. 4 is a graphical representation of a method of sample clock recovery.

Referring also to FIG. 4, within the time interval 63 (indicated by a bracket) represented by successive timestamps 60A, 608, 60C the sample clock recoverer 78 triggers a clock edge 120 completing a sample clock cycle 122 for each of the data packet's application data blocks 66 specified in the data block count in the data packet header. In a two channel (stereo) audio system each 12S data block contains a respective data sample 124, 126 for each of the two channels.

In Ser. No. 14/186,852, the sample or media clock recovery provides, in essence, a distributed phase locked loop (PLL) for the network with identical sample clocks generated at each listener 54 processing a respective medium. As taught herein, rather than using PLL hardware, this application accomplishes these functions with an Estimator 308 and a Sample Rate Converter (SRC) code 310.

Ideally, AVB synchronizes the outputs of the network's listeners by delivering data to each end point's media interface, for examples, a controller for a video display or the digital-to-analog converters (DAC) of plural wireless speakers, at the synchronized wall times specified in the timestamps and at a rate determined by synchronic sample clocks.

While ideally the sample clocks regulating the rendering the each medium and the wall clocks controlling presentation time are synchronized, packets are commonly lost in a wireless network and each receiver receives a respective aliased subsample of the data packets and accompanying timestamps conveyed in the data stream. Loses during packet transfer, clock jitter and resulting sample clock variation make it difficult to maintain less than 50 μs channel-to-channel latency which is desired for high quality, multi-channel, surround sound audio. The inventor concluded that synchronicity in presenting related content at plural network endpoints would be promoted by introducing a frequency filtering function in the clock path at a sample clock recoverer enabling recovery of a band limited sample clock which is, in turn, copied to other listeners requiring the same sample clock, for example, plural surround speaker units of an audio/video system.

Figure 5A:
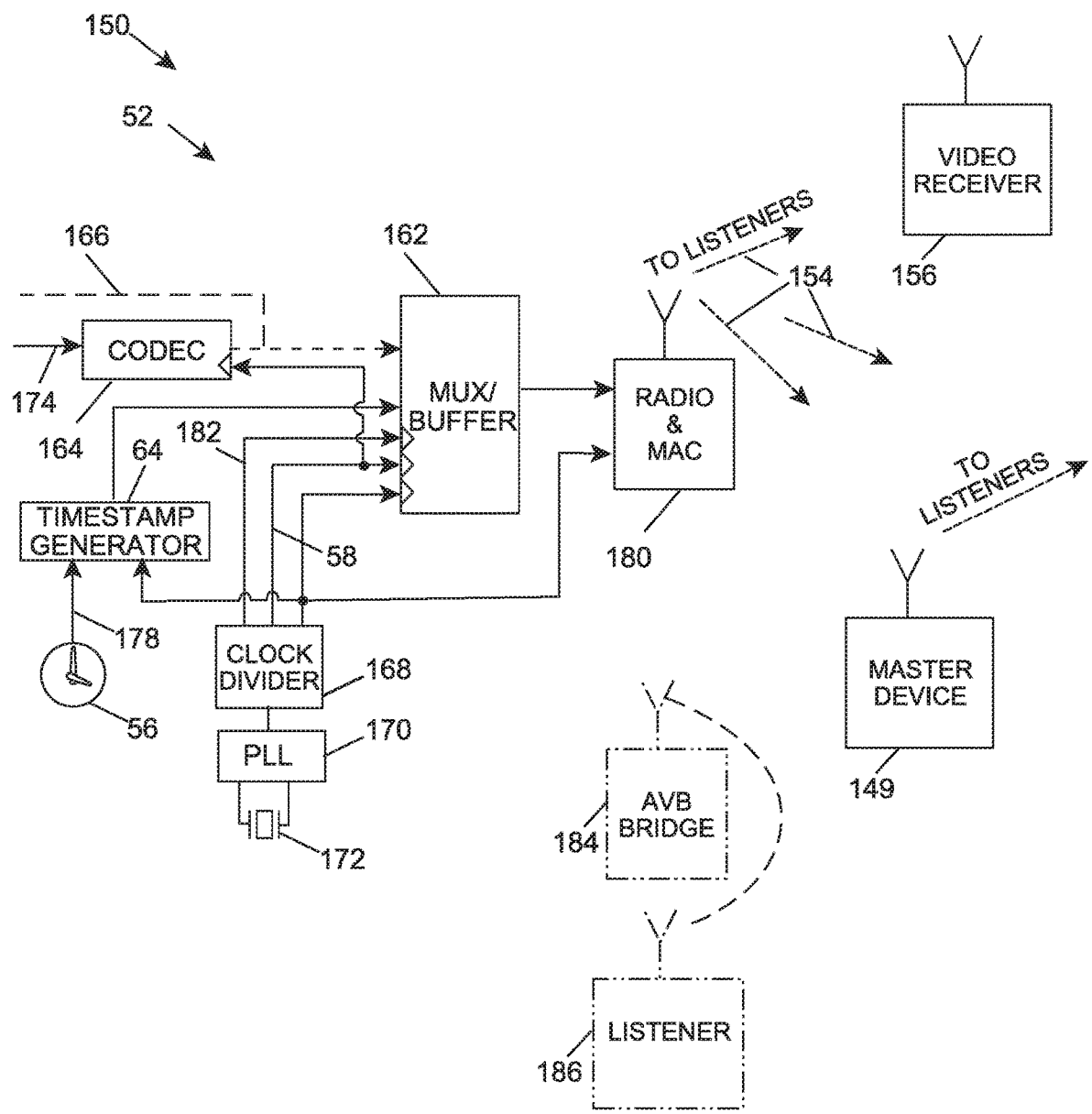
FIG. 5A is a block diagram of a first portion of a wireless network.

Referring also to FIGS. 5A and 58, a wireless network 150, for example a network transporting video and surround sound audio, comprises plural network endpoints (stations) 52, 149, 156, 158, 160, 162A-162C. One of the end points 149 includes the master clock or master TSF timer and periodically transmits a PTP message or a TSF beacon frame to facilitate synchronization of the wall clocks, for examples wall clocks 178, 218, of the other network endpoints.

One of the network's endpoints is a talker 52 that receives application data, for example, audio and/or video data, from a source such as a digital video disk (DVD) player or a television set-top box, and transmits the data in a packetized serial data stream 154 to a plurality of listeners 54, for examples, a wireless video display 156 and a plurality wireless speakers 158, 160, 162A-162C for multichannel surround sound. Six channel surround sound audio systems, known as 5.1 ("five point one") surround systems, utilize five full bandwidth channels; a front left channel, a front center channel, a front right channel and left and right surround channels, each reproduced by a corresponding speaker. In addition, the 5.1 surround sound system includes one low-frequency effects channel, the point one (0.1) channel, which is reproduced by a subwoofer.

Increasingly, manufacturers of home theater systems are adopting eight channel (7.1) surround sound and high end systems, such as an 11.1 surround sound system, are contemplated.

The talker 52 comprises a multiplexer/buffer (MUX/buffer) 162 which serially, packetizes digitized analog audio/video data 174 output by a coder/decoder (codec) 164 or digital audio/video data 166 obtained from a digital data source. A clock divider 168, driven by phase locked loop (Type-III PLL) 170 and a crystal oscillator 172, outputs a sample clock 58, an alternating signal, which times the sampling of the analog audio/video data 174 by the codec 164. The sample clock 58 is also input to a timestamp generator 64 which based on wall time 178 output by the talker's wall clock 56 produces a presentation timestamp 60 indicating the wall time for initiating presentation of application data in a data packet 62 and signals the MUX to insert the presentation timestamp into the header of the data packet. The sample clock 58 is also input to the MUX/buffer 162 to control the rate at which the MUX captures the data at its inputs and multiplexes the data to serial data packets containing plural application data samples, for example audio data samples. The serialized data packet is buffered and transmitted from the buffer to a radio transceiver/media access controller (MAC) 180. A bus interface clock signal 182 times the transmission of the packetized data from the MUX/buffer 162 to the radio transceiver and MAC. The media access controller (MAC) adds a media access address identifying the device that is to receive the data packet and the transceiver modulates the data packet with a carrier and transmits the radio frequency data stream 154 to appropriate network listeners, for examples, a receiver of the video display 156 and the respective receivers of the surround sound audio speaker units 158, 160, 162A-162C. AVB also provides for transmissions to a "bridge" 184 which may relay data transmitted by the talker 50 to a second network, including listener 186, and which acts as a slave clock to the talker network's grandmaster clock and as a master clock to the network, comprising listener 186, to which it retransmits the data.

Each of the network's listeners, for example, the speaker units 158, 160, 162A-162C of the surround sound system, receive packetized data 154 transmitted by the talker 52 to the listener's respective MAC address. However, particularly in a network comprising a wireless communication link, data packets may be lost so each listener may receive only an aliased subset of the transmission. In the network 150, one of the plural speaker units 158 is designated as the sample clock recoverer for the other speaker units 160, 162A-162C of the surround sound system. The radio transceiver and MAC unit 202 of the sample clock recoverer receives the steam of data packets addressed to speaker unit 158 and transmits them to a demultiplexer/buffer 204 where the data in the data packets are disassembled and buffered. The presentation timestamp 60 for each data packet is transmitted to a timestamp comparer 206.

The time interval 63 represented by successive time stamps is signaled to a Type-II PLL 208 by the timestamp comparer 206. In addition, the number of data blocks in a data packet, as specified in the data block count field in the packet header, is input to a counter 210 in a feedback loop of the PLL 208. Within the time interval represented by the difference between successive timestamps, the counter 210 in the feedback loop causes the PLL 208 to output an alternating signal, a raw recovered sample clock 79, with a respective clock edge 120 for each of the data blocks 66 included in the data packet. The raw recovered sample clock 79 is input to a low bandwidth Type-II PLL 211 which frequency filters the raw sample clock signal to eliminate jitter and produce a cleaner band limited recovered sample clock signal 80. Band limiting the recovered sample clock signal produces a signal with a frequency centered on the mean frequency of the raw signal, substantially reducing jitter in the sample clock signal so that the sample clocks of other listeners utilizing the recovered sample clock, for example, the other surround sound speaker units 160, 162A-162C, are more nearly identical to the recovered sample clock 80.

The bandlimited recovered sample clock 80 is also input to a clock divider 212 which outputs a bus clock signal 214 to the buffer/DEMUX 204. The recovered sample clock signal 80 is transmitted to the buffer/DEMUX 204 and to the digital-to-analog converter (DAC) 216 to control the processing rate for the audio data samples contained in the data packets. The timestamp comparer 206 compares the timestamp in the data packet to the wall time of the slave clock 218 of the speaker unit and appropriately outputs a signal to the DAC when the DAC is to initiate converting the respective digital audio data, at the rate established by the recovered sample clock 80, to an analog signal 86 which controls the operation of the speaker 220.

The bandlimited recovered sample clock 80 is transmitted to the transceiver and MAC 202 of the sample clock recoverer 158 where it is modulated with a carrier and transmitted to other surround sound speaker units 160, 162A-162C. Anticipating packet loss and satisfying the Nyquist sampling criterion, the rate at which the sample clock information is updated at the other speakers is set at least twice the limiting bandwidth of the recovered sample clock. For example, if the timing at a speaker is updated every 100 ms and the peak packet error rate (PER) is 75%, the low bandwidth PLL 211 of the sample clock recoverer 158 is set to no more than 1.25 Hz. The modulated recovered sample clock signal is received by the transceiver and MAC 240 of the other speaker unit(s) where it is input to the respective buffer/DEMUX units 242 and transmitted to the DAC 244 to control the rate at which audio data samples in data packets addressed to the respective MAC by the talker 52 are processed. The timestamps 60 in the data stream are separated from the application data and compared to the synchronized local wall time 246 by the timestamp comparer 248 which signals the buffer/DEMUX to input the application data from the respective data packet to the DAC 244 for presentation by the speaker.

Alternatively, the bandlimited sample clock may be recovered without frequency filtering the raw sample clock output. Referring also to FIG. 5C, the raw PTP and TSF wall time data 217 contained respectively in the PTP messages and TSF beacon frames is separated in the buffer/DEMUX 204 of the listener 159 and transmitted to a frequency filtering device, preferably, a low band width Type-II PLL 219, to band limit the wall time around the average or mean frequency. The band limited PTP and TSF time signal 221 reduces jitter at the wall clock 218 of the listener 159 which band limits the sample clock output 80 of the PLL 208 which is input to the buffer/DEMUX 204 and the DAC 216. The bandlimited wall time 223 is transmitted 261 to the other listeners 161, 162A-162C, including the talker 52, where it is input to the respective timestamp comparers 64, 249 causing the bandlimited sample clock 80 to be output by the respective PLL 209. The application data in the data stream 154 from the talker is processed at a rate determined by the bandwidth limited sample clock 80 and presented at wall times determined by the synchronized local wall time 223.

Figure 5B:
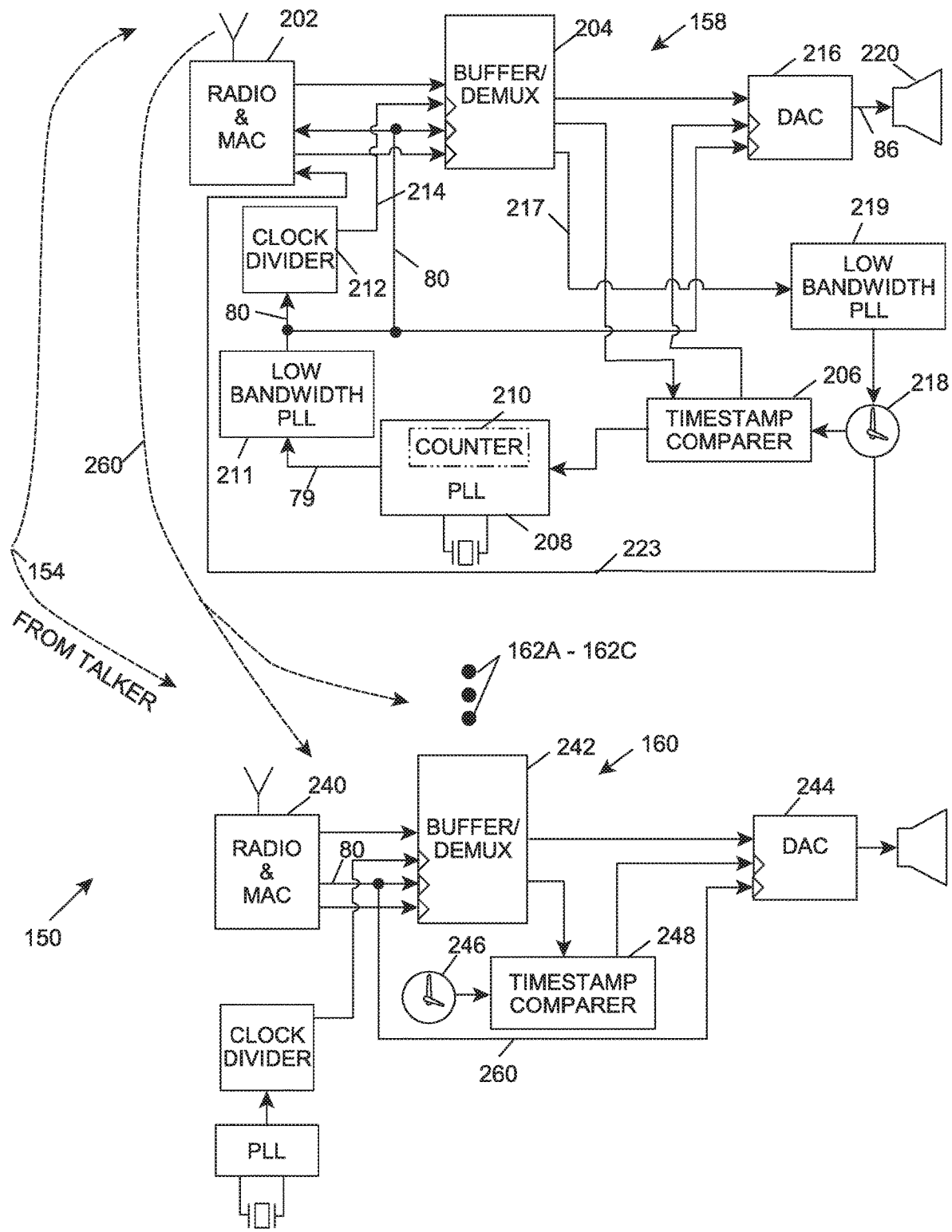
FIG. 5B is a block diagram of a second portion of the wireless network of FIG. 5A including a first embodiment of a sample clock recoverer.
Figure 5C:
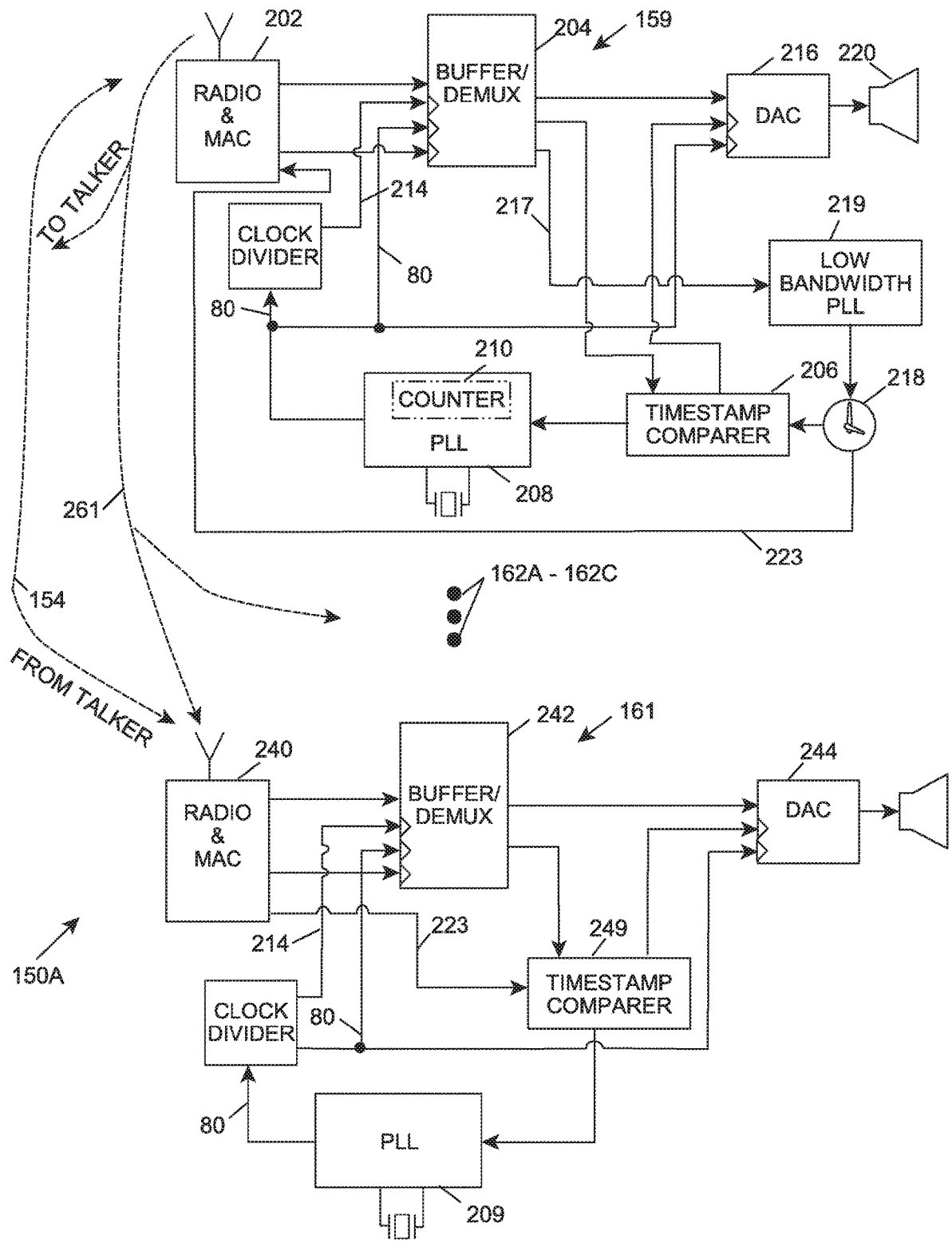
FIG. 5C is a block diagram of a second portion of the wireless network of FIG. 5A including a second embodiment of a sample clock recoverer.

Alternatively, as illustrated in FIG. 5B, the frequency filtering function can be applied to both the output of the PLL 208 and the raw wall time data 217. The low bandwidth PLL 219 band limits wall time 223 which can be transmitted to the other listeners of the network with the bandlimited sample clock 80.

By introducing a frequency filtering function in the clock path with the low bandwidth PLL 211 and/or the low bandwidth PLL 219 jitter is removed from the sample clock and/or the wall clock substantially reducing aliasing and improving the synchronization of the outputs of the network.

Figure 7:
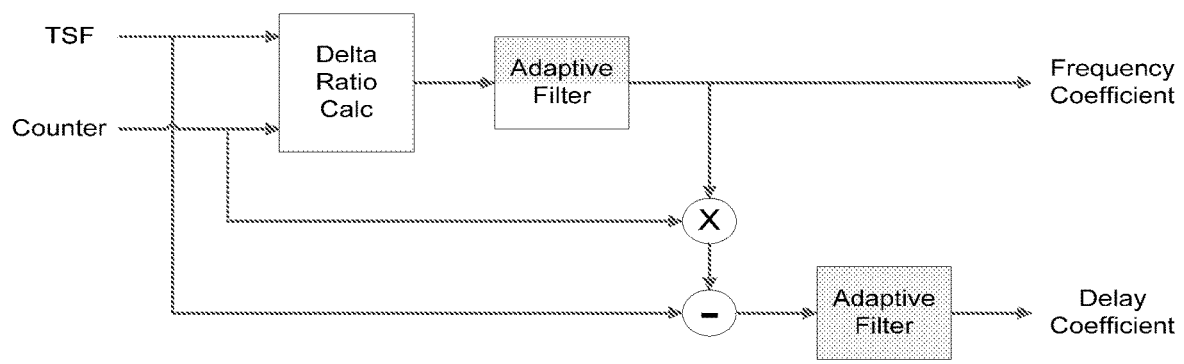
FIG. 7 is a block diagram of an alternative embodiment of the method using an estimator.

In an alternate embodiment shown in FIG. 7, the TSF PLL above is replaced with an Estimator which measures and filters TSF value against the internal Counter/Timer of the audio subsystem processor. The Estimator is presented with TSF and Counter pairs sampled at the same instant, so that the frequency and delay relationship between the two can be determined.

Figure 8:
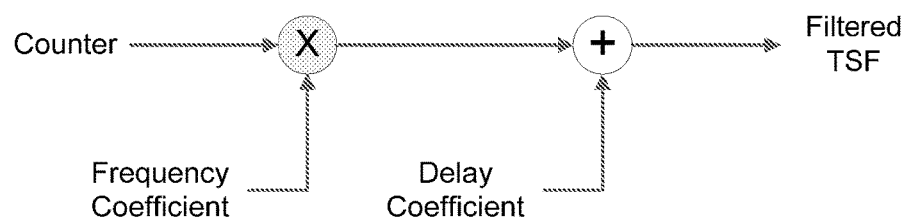
FIG. 8 is a block diagram of the generation of a filtered TSF value.

From this Estimator, the Frequency and Delay Coefficients are generated which then can be applied to the Counter value at any time to generate the filtered TSF value, as shown in FIG. 8. Adaptive filters are required for this application, so that the Coefficients are available immediately to be used to process audio and over time will improve in accuracy by lowering the jitter.

This filtered TSF value is used at the audio talker to generate the Presentation Time of the block of audio data that is transmitted. The block size is set to be some multiple of the audio data interleaver length.

Figure 9:
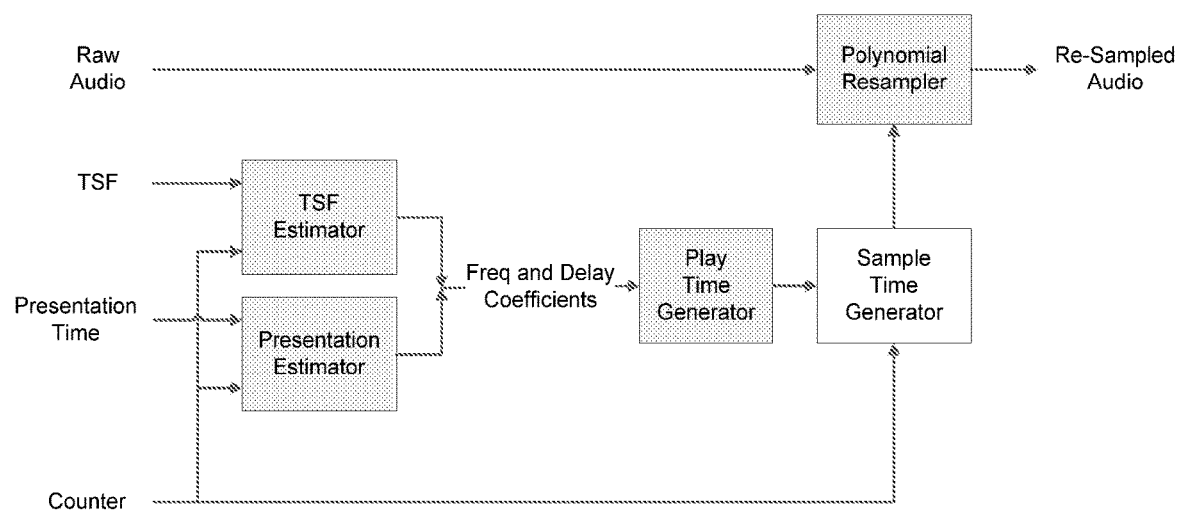
FIG. 9 is a block diagram showing resampling to a local audio clock.

At the audio listener the Presentation Time and the beacon TSF values are estimated to the local audio clock by the same method used at the audio transmitter source. The audio is then resampled to the local audio clock rather than use a PLL to generate the clock, as shown in FIG. 9.

Figure 6:
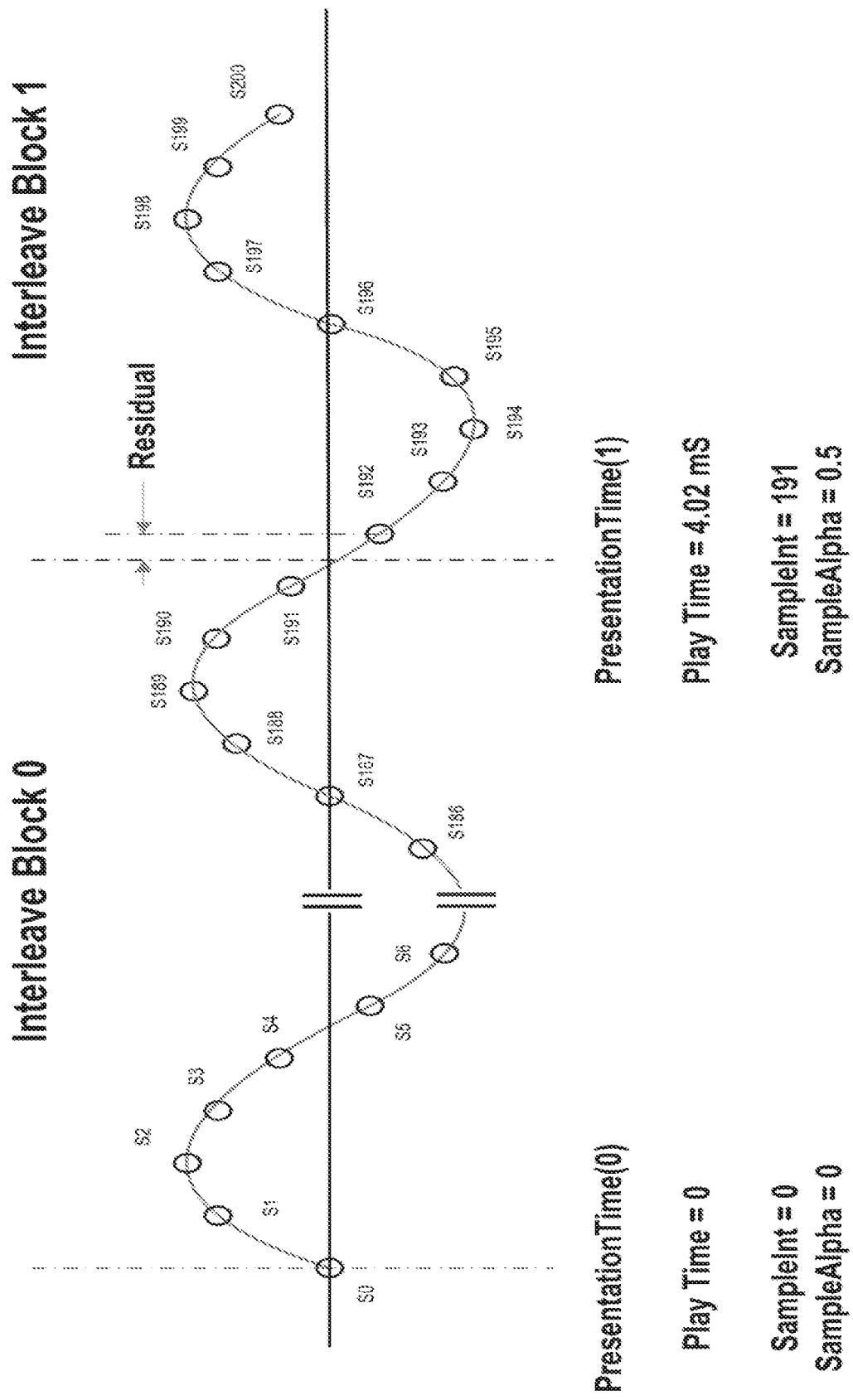
FIG. 6 is a graphical representation of a sample timing for the resampler.

The frequency and delay coefficients are combined (Frequency Coefficients are multiplied and Delay Coefficients are added) to make the Play Time of each block. The Play Time is used to generating the sample timing for the resampler. An example of this sample timing is shown in FIG. 6 where $S_x$ denotes sampling intervals.

At the start of the audio playback the sample spacing is assumed to be ideal, and at the beginning of each new block the Play Time is compared to elapsed time to that point. The residual error from the previous block is then then compensated for in the new block dividing the previous error equally over all samples of the new block or alternatively future blocks recursively. This allows the audio playback to start immediately without having to wait for the next PlayTime to determine the exact sample spacing.

In prior applications, a hardware methodology for recovering and filtering audio timing was presented. The key circuit element in the prior approach, which is not available on most generic processor SOCs, is a low bandwidth Phase lock Loop (PLL). This PLL was used twice; to filter the beacon based Time Synchronization function (TSF) value and to generate the output audio clock (see 208 and 210). For a soft implementation, these two hardware functions are converted to an Estimator (308) and a Sample Rate Converter (SRC) code (310).

In the present application, the TSF PLL is replaced with an Estimator (308) which measures and filters TSF value against the internal Counter/Timer of the audio subsystem processor. The Estimator is presented with TSF and Counter pairs sampled at the same instant so that the frequency and delay relationship between the two can be determined.

An embodiment of this system is illustrated in FIG. 7. For purposes of this embodiment, it may be assumed that the following Interleavering Block Size

| At 48 kHz | Interleaver size: in packets per interleaving | |
| --- | --- | --- |
| Packet size: in samples per packet | 4 | 8 |
| | 48 | 192 | 384 |
| | 96 | 384 | 768 |

From this Estimator (308), the Frequency and Delay Coefficients are generated which then can be applied to the Counter value at any time to generate the filtered TSF value, as shown in FIG. 8. Adaptive filters are required for this application so that the Coefficients are available immediately to be used to process audio and over time will improve in accuracy by lowering the jitter.

This filtered TSF value is used at the audio talker to generate the Presentation Time of the block of audio data that is transmitted. The block size is set to be some multiple of the audio data interleaver length.

At the audio listener, the Presentation Time and the beacon TSF values are estimated to the local audio clock by the same method used at the audio transmitter source. The audio is then resampled to the local audio clock, rather than to a PLL to generate the clock.

As shown in FIG. 9, the frequency and delay coefficients are combined (Frequency Coefficients are multiplied, and Delay Coefficients are added) to make the Play Time of each block. The Play Time is used to generating the sample timing for the resampler, an example of which is as illustrated in FIG. 6.

At the start of the audio playback, the sample spacing is assumed to be ideal, and at the beginning of each new block, the Play Time is compared to elapsed time to that point. The residual error from the previous block is distributed over the next block or alternatively future blocks recursively. This allows the audio playback to start immediately without having to wait for the next PlayTime to determine the exact sample spacing.

One embodiment of this method of recovering audio timing in a network includes bandlimiting a raw wall time signal about a mean frequency of the raw wall time signal by estimating the frequency and delay of the raw wall time signal to a local transmitter audio clock; including timing datum in a data packet about the mean frequency of the timing signal from the estimate of the frequency and delay of the timing signal and the audio playtime at the transmitter; bandlimiting the raw wall time signal about the mean frequency of the raw wall time signal by estimating the frequency and delay of said raw wall time signal to a local receiver audio clock; combining both wall time estimation and received timing datum estimation from a packet to generate an audio play time at the receiver; using the playtime generate coefficients for a polynomial interpolator that resamples the audio to the receiver audio clock.

In another embodiment, an audio system is provided, where the audio system comprises a first listener having a wall clock maintaining a wall time for occurrence of an event, said wall time updated by data transmitted by a master clock and received by said first listener; a sample clock recoverer retrieving a sample clock from data received by said first listener from a talker, said sample clock regulating a processing rate for a datum included in said data received from said talker; and a frequency filter bandlimiting said sample clock output by said sample clock recoverer, wherein said frequency filter comprises an estimator connected to receive said sample clock output by said sample clock recoverer; and a transmitter transmitting said bandlimited sample clock; and the audio system further comprises a second listener arranged to receive said transmitted bandlimited sample clock and use said bandlimited sample clock to regulate processing data received from said talker. Such a system may include that first listener is a frequency filter attenuating a frequency of said updating data received from said master clock. Such a system may include that the updating data received from said master clock is a timing synchronization function datum or a precision time protocol datum.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference. The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

I claim:

1. An audio system comprising:
   (a) a first listener including:
      (i) a wall clock maintaining a wall time for occurrence of an event, said wall time updated by data transmitted by a master clock and received by said first listener;
      (ii) a sample clock recoverer retrieving a sample clock from data received by said first listener from a talker, said sample clock regulating a processing rate for a datum included in said data received from said talker; and
      (iii) a frequency filter bandlimiting said sample clock output by said sample clock recoverer, wherein said frequency filter comprises an estimator connected to receive said sample clock output by said sample clock recoverer; and
      (iv) a transmitter transmitting said bandlimited sample clock; and
   (b) a second listener arranged to receive said transmitted bandlimited sample clock and use said bandlimited sample clock to regulate processing data received from said talker.

2. The audio system of claim 1 wherein the first listener further comprises a frequency filter attenuating a frequency of said updating data received from said master clock.

3. The audio system of claim 2 wherein said updating data received from said master clock comprises a timing synchronization function datum.

4. The audio system of claim 2 wherein said updating datum received from said master clock comprises a precision time protocol datum.

5. An audio system comprising:
   (a) a first listener including:
      (i) a wall clock maintaining a wall time for occurrence of an event, said wall time updated by a data transmitted by a master clock and received by said first listener;
      (ii) a frequency filter bandlimiting said updating data received from said master clock and said wall time, wherein said frequency filter comprises an estimator connected to receive said updating data by said sample clock recoverer; and
      (iii) a sample clock recoverer retrieving a sample clock from data received by said first listener from a talker, said sample clock regulating a processing rate for a datum included in said data received from said talker; and
      (iv) a transmitter transmitting said bandlimited wall time; and
   (b) a second listener arranged to receive said bandlimited wall time and to use said bandlimited wall time to recover a sample clock from data received from said talker.

6. The audio system of claim 5 wherein said updating data received from said master clock comprises a timing synchronization function datum.

7. The audio system of claim 5 wherein said updating datum received from said master clock comprises a precision time protocol datum.

8. A method of recovering audio timing in a network, the method comprising the steps of:
   (a) bandlimiting a raw wall time signal about a mean frequency of the raw wall time signal by estimating the frequency and delay of the raw wall time signal to a talker transmitter audio clock; and
   (b) including timing datum in a data packet about the mean frequency of said timing signal from the estimate of the frequency and delay of said timing signal and an audio playtime at the transmitter; and
   (c) bandlimiting said raw wall time signal about the mean frequency of said raw wall time signal by estimating the frequency and delay of said raw wall time signal to a listener receiver audio clock; and
   (d) combining both wall time estimation and received timing datum estimation from a packet to generate audio play time at the receiver; and
   (e) using the playtime to generate coefficients for a polynomial interpolator that resamples the audio to the receiver audio clock.

9. A method of recovering audio timing in a network, the method comprising the steps of:
   (a) bandlimiting a raw wall time signal about a mean frequency of the raw wall time signal by estimating the frequency and delay of the raw wall time signal to the listener receiver audio clock;
   (b) estimating the frequency and delay of this wall time signal to the transmitter audio clock by the talker transmitter requesting a copy of the wall time signal from the receiver and bandlimiting about a mean frequency of this wall time signal by;
   (c) including timing datum in a data packet about the mean frequency of said timing signal from the estimate of the frequency and delay of said timing signal and an audio playtime at the transmitter; and
   (d) combining both wall time estimation and received timing datum estimation from a packet to generate audio play time at the receiver; and
   (e) using the playtime to generate coefficients for a polynomial interpolator that resamples the audio to the receiver audio clock.

10. A method of recovering audio timing in a network, the method comprising the steps of:
(a) bandlimiting a raw wall time signal about a mean frequency of the raw wall time signal by estimating the frequency and delay of the raw wall time signal to the talker transmitter audio clock;
(b) including timing datum in a data packet about the mean frequency of said timing signal from the estimate of the frequency and delay of said timing signal and an audio playtime at the transmitter;
(c) estimating the frequency and delay of this wall time signal to the receiver audio clock by the listener receiver requesting a copy of the wall time signal from the transmitter and bandlimiting about a mean frequency of this wall time signal; and
(d) combining both wall time estimation and received timing datum estimation from a packet to generate audio play time at the receiver; and
(e) using the playtime to generate coefficients for a polynomial interpolator that resamples the audio to the receiver audio clock.

11. A method of recovering audio timing in a network, the method comprising the steps of:
(a) bandlimiting a raw wall time signal about a mean frequency of the raw wall time signal by estimating the frequency and delay of the raw wall time signal to a talker transmitter audio clock; and
(b) including timing datum in a data packet about the mean frequency of said timing signal from the estimate of the frequency and delay of said timing signal and an audio playtime at the transmitter; and
(c) bandlimiting said raw wall time signal about the mean frequency of said raw wall time signal by estimating the frequency and delay of said raw wall time signal to a listener receiver audio clock; and
(d) combining both wall time estimation and received timing datum estimation from a packet to generate audio play time at the receiver; and
(e) using the playtime to generate coefficients for a fractional delay filter that resamples the audio to the receiver audio clock.

12. A method of recovering audio timing in a network, the method comprising the steps of:
(a) bandlimiting a raw wall time signal about a mean frequency of the raw wall time signal by estimating the frequency and delay of the raw wall time signal to the listener receiver audio clock;
(b) estimating the frequency and delay of this wall time signal to the transmitter audio clock by the talker transmitter requesting a copy of the wall time signal from the receiver and bandlimiting about a mean frequency of this wall time signal by;
(c) including timing datum in a data packet about the mean frequency of said timing signal from the estimate of the frequency and delay of said timing signal and an audio playtime at the transmitter; and
(d) combining both wall time estimation and received timing datum estimation from a packet to generate audio play time at the receiver; and
(e) using the playtime to generate coefficients for a fractional delay filter that resamples the audio to the receiver audio clock.

13. A method of recovering audio timing in a network, the method comprising the steps of:
(a) bandlimiting a raw wall time signal about a mean frequency of the raw wall time signal by estimating the frequency and delay of the raw wall time signal to the talker transmitter audio clock;
(b) including timing datum in a data packet about the mean frequency of said timing signal from the estimate of the frequency and delay of said timing signal and an audio playtime at the transmitter;
(c) estimating the frequency and delay of this wall time signal to the receiver audio clock by the listener receiver requesting a copy of the wall time signal from the transmitter and bandlimiting about a mean frequency of this wall time signal; and
(d) combining both wall time estimation and received timing datum estimation from a packet to generate audio play time at the receiver; and
(e) using the playtime to generate coefficients for a fractional delay filter that resamples the audio to the receiver audio clock.

* * * * *

UNITED STATES PATENT AND TRADEMARK OFFICE
CERTIFICATE OF CORRECTION

PATENT NO. : 10,582,461 B2
APPLICATION NO. : 15/863637
DATED : March 3, 2020
INVENTOR(S) : Kenneth A. Boehlke Page 1 of 1

It is certified that error appears in the above-identified patent and that said Letters Patent is hereby corrected as shown below:

On the Title Page

Item (63) "Continuation of application No. 15/660,800,..." should be -- Continuation-in-part of application No. 15/660,800,... --

In the Specification

Column 1, Line 48 "... greater than 50 microsecond (ρs) ..." should be -- ... greater than 50 microsecond (μs) ... --

Column 3, Lines 31-32 "FIG. 5A is a block diagram of a first portion of a wireless network." should be deleted Column 6, Line 8 "...stamps 60A, 608, 60C..." should be -- ...stamps 60A, 60B, 60C... --

Column 6, Line 12 "In a two channel (stereo) audio system each 12S data block ..." should read -- In a two channel (stereo) audio system each I2S data block ... --

Column 6, Line 47 "Referring also to FIGS. 5A and 58..." should be -- Referring also to FIGS. 5A and 5B... --

Column 7, Line 12 "...(Type-III PLL)..." should be -- ...(Type-II PLL)... --

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*